(12) United States Patent
Sun et al.

(10) Patent No.: US 11,703,076 B2
(45) Date of Patent: Jul. 18, 2023

(54) CLINCH FASTENER WITH A SPIRAL SHANK

(71) Applicant: Penn Engineering & Manufacturing Corp., Danboro, PA (US)

(72) Inventors: Qiang Sun, Kunshan (CN); Dapeng Duan, Kunshan (CN); Larry Zhang, Kunshan (CN)

(73) Assignee: Penn Engineering & Manufacturing Corp., Danboro, PA (US)

( * ) Notice: Subject to any disclaimer, the term of this patent is extended or adjusted under 35 U.S.C. 154(b) by 169 days.

(21) Appl. No.: 16/448,675

(22) Filed: Jun. 21, 2019

(65) Prior Publication Data

US 2020/0011367 A1 Jan. 9, 2020

(30) Foreign Application Priority Data

Jul. 6, 2018 (CN) .......................... 201810736765.X

(51) Int. Cl.
| | |
|---|---|
| *F16B 39/00* | (2006.01) |
| *F16B 37/06* | (2006.01) |
| *F16B 5/00* | (2006.01) |
| *B21J 15/36* | (2006.01) |

(52) U.S. Cl.
CPC .......... *F16B 37/068* (2013.01); *F16B 5/0004* (2013.01); *B21J 15/36* (2013.01)

(58) Field of Classification Search
CPC .... F16B 37/068; F16B 37/062; F16B 37/065; F16B 5/0004; F16B 37/122; F16B 37/127; F16B 19/06; F16B 39/284; F16B 5/04; B21J 15/36; B21C 23/18; B21C 23/183; B21C 23/186

USPC ......................................................... 411/453
See application file for complete search history.

(56) References Cited

U.S. PATENT DOCUMENTS

| | | | | |
|---|---|---|---|---|
| 1,891,895 A | * | 12/1932 | Nagel ..................... | F16B 19/02 |
| | | | | 411/453 |
| 2,183,243 A | | 12/1939 | Meersteiner | |
| 2,191,771 A | * | 2/1940 | Olson ..................... | F16B 19/02 |
| | | | | 411/456 |
| 2,372,779 A | * | 4/1945 | Herman .................. | A41H 15/00 |
| | | | | 269/54.5 |
| 2,515,773 A | * | 7/1950 | Johnson .................. | F16B 15/06 |
| | | | | 411/453 |

(Continued)

FOREIGN PATENT DOCUMENTS

CN 2174586 Y 8/1994

OTHER PUBLICATIONS

NPL#1: ABS Plastics, Mar. 12, 2016, What-When-How, p. 6, <https://web.archive.org/web/20160312103859/http://what-when-how.com/materialsparts-and-finishes/abs-plastics> (Year: 2016).*

*Primary Examiner* — Gary W Estremsky
(74) *Attorney, Agent, or Firm* — Gregory J. Gore, Esq.

(57) ABSTRACT

A press-in fastener has from top to bottom: a head, a clinch feature, and a spiral, knurled shank. The fastener can hold two parts together by first clinching with a first metal panel, and then being pressed into a hole in a second, less ductile panel having a uniform interference between the knurled fastener shank and the hole. The knurled shank has a helix configuration that allows for use in non-ductile materials and eliminates the need for tapered holes and screws for applications that do not require disassembly.

11 Claims, 2 Drawing Sheets

(56) References Cited

U.S. PATENT DOCUMENTS

| | | | | |
|---|---|---|---|---|
| 3,127,919 A * | 4/1964 | Klas | | F16B 37/068 |
| | | | | 411/188 |
| 3,252,495 A * | 5/1966 | Waltermire | | F16B 4/004 |
| | | | | 411/176 |
| D219,953 S * | 2/1971 | Ernest | | D8/387 |
| 3,770,037 A * | 11/1973 | Ernest | | F16B 35/06 |
| | | | | 411/184 |
| 3,782,436 A * | 1/1974 | Steiner | | F16B 35/06 |
| | | | | 411/184 |
| 4,925,353 A * | 5/1990 | Perugini | | F16B 15/02 |
| | | | | 411/230 |
| 5,186,590 A * | 2/1993 | Oldendorf | | B44C 7/022 |
| | | | | 411/45 |
| 5,340,254 A * | 8/1994 | Hertel | | F16B 25/0021 |
| | | | | 411/311 |
| 5,513,933 A * | 5/1996 | Rom | | B23P 19/062 |
| | | | | 29/432.2 |
| 5,575,601 A * | 11/1996 | Skufca | | F16B 17/008 |
| | | | | 29/525.05 |
| 5,743,691 A * | 4/1998 | Donovan | | B23P 19/062 |
| | | | | 411/180 |
| 6,193,456 B1 * | 2/2001 | Stumpf | | F16B 37/122 |
| | | | | 411/180 |
| 6,817,815 B2 * | 11/2004 | Ross | | F16B 35/048 |
| | | | | 411/107 |
| 7,520,710 B2 * | 4/2009 | Ortler | | F16B 15/00 |
| | | | | 411/440 |
| 8,092,505 B2 * | 1/2012 | Sommers | | A61B 17/68 |
| | | | | 606/317 |
| 8,529,180 B1 * | 9/2013 | Sargis | | F16B 15/00 |
| | | | | 411/453 |
| 8,888,428 B2 * | 11/2014 | Park | | B21K 1/70 |
| | | | | 411/180 |
| 8,979,455 B2 * | 3/2015 | Burton | | F16B 33/002 |
| | | | | 411/166 |
| 9,151,312 B2 * | 10/2015 | Diehl | | F16B 37/065 |
| 9,995,329 B2 * | 6/2018 | Cho | | B21J 15/025 |
| 2004/0096295 A1 * | 5/2004 | Stevenson | | B21J 15/025 |
| | | | | 411/501 |
| 2007/0269288 A1 * | 11/2007 | Palm | | F16B 39/225 |
| | | | | 411/386 |
| 2009/0047095 A1 * | 2/2009 | Pritchard | | F16B 25/0047 |
| | | | | 411/411 |
| 2009/0155021 A1 * | 6/2009 | Versino | | F16B 15/06 |
| | | | | 411/487 |
| 2011/0195380 A1 * | 8/2011 | Giorno | | B21H 3/06 |
| | | | | 600/25 |
| 2012/0328391 A1 * | 12/2012 | Levey | | F16B 39/30 |
| | | | | 411/337 |
| 2013/0017032 A1 * | 1/2013 | Levey | | F16B 37/122 |
| | | | | 411/103 |
| 2013/0273500 A1 * | 10/2013 | Giorno | | A61C 8/0022 |
| | | | | 433/174 |
| 2013/0302107 A1 * | 11/2013 | Burton | | F16B 37/068 |
| | | | | 411/166 |
| 2013/0322987 A1 * | 12/2013 | Lee | | F16B 19/086 |
| | | | | 411/504 |
| 2014/0003883 A1 * | 1/2014 | Osborn | | F16B 37/068 |
| | | | | 411/500 |
| 2014/0023452 A1 * | 1/2014 | Maloney | | F16B 39/284 |
| | | | | 411/166 |
| 2017/0114814 A1 * | 4/2017 | Maloney | | F16B 37/068 |
| 2017/0184143 A1 * | 6/2017 | Prabhu | | F16B 37/127 |
| 2018/0266475 A1 * | 9/2018 | Hoshino | | F16B 35/048 |
| 2020/0337752 A1 * | 10/2020 | Wickham | | A61B 17/8625 |

* cited by examiner

CLINCH FASTENER WITH A SPIRAL SHANK

RELATED APPLICATION

The present application is a non-provisional patent application related to Chinese patent application 201810736765.X filed on Jul. 7, 2018 priority from which is hereby claimed.

FIELD OF THE INVENTION

The present invention relates to a press-in fastener. More particularly, the present invention relates to a press-in fastener having a clinch feature and a spiral, knurled shank.

BACKGROUND OF THE INVENTION

In the prior art, non-ductile panels are often connected by installing an insert in one panel to provide a threaded bore. Then, a second panel is attached by installing a loose screw through the second panel and connecting it to the female threads of the insert. The screw can be applied either manually or automatically. In the prior art, the insert is installed into the non-ductile panel by separate mold-in or press-in processes. The screw usually requires a patch or lock washer to have anti-loose function. This operation cannot be done with a one-step, simple process, which results in a high manufacturing cost.

There is therefore a need in the art for a fastener which can economically and effectively join two panels only one of which is required to be ductile.

SUMMARY OF THE INVENTION

The present invention has been devised to meet the need in the art explained above by providing a press-in fastener having from top to bottom: a head, a clinch feature, and a spiral, knurled shank. The fastener can hold two parts together by first clinching with a first metal panel, and then being pressed into a hole in a second, non-ductile panel having a uniform interference between the knurled fastener shank and the hole. The knurled shank design allows for use in less ductile materials and eliminates the need for tapered holes and screws for applications that don't require disassembly.

More specifically, the applicant has devised a fastener comprising, from top to bottom, a head at the top being the largest diameter of the fastener; a displacer located immediately below the head; an undercut adapted to receive the cold flow of material from a first object caused by contact with the displacer; and a spiral shank extending downwardly from the undercut to a distal bottom end of the fastener, said shank having a spiral helix outer surface composed of crests and valleys between the crests. The outer surface crests preferably lie more or less at a helix angle of 45 degrees to a central axis of the fastener.

The above described fastener is particularly suited to an assembly comprising: a first object having a first hole for receiving the fastener being pressed into the first object hole and affixed to the first object by the cold flow of material of the first object into the fastener undercut. The assembly includes a second object having a second hole for receiving the spiral shank of the fastener whereby the shank is rigidly affixed to the second object by interference fit with the crests of the shank and the first and second objects while positioned in abutment are thereby rigidly affixed to each other.

The second object can be a less ductile material such as a printed circuit board (PCB) or a plastic such as ABS, while the first object may be a panel of ductile material such as aluminum.

The advantages of the inventive fastener are many. The novel fastener provides fixation into less ductile materials or panels via broaching by simple and inexpensive press-in step. Installation times can be greatly reduced by using an automated installation system and press machines. The under-head clinching feature can be clinched into metal panels also by simply being pressed-in. These characteristics allow the fastener to be used in an automated assembly process, which improves installation efficiency and reduces cost compared to the prior art. Other objects and advantages will be apparent to those of skill in the art from the following drawings and detailed description of one embodiment.

DETAILED DESCRIPTION OF THE PREFERRED EMBODIMENTS

Figure 1:
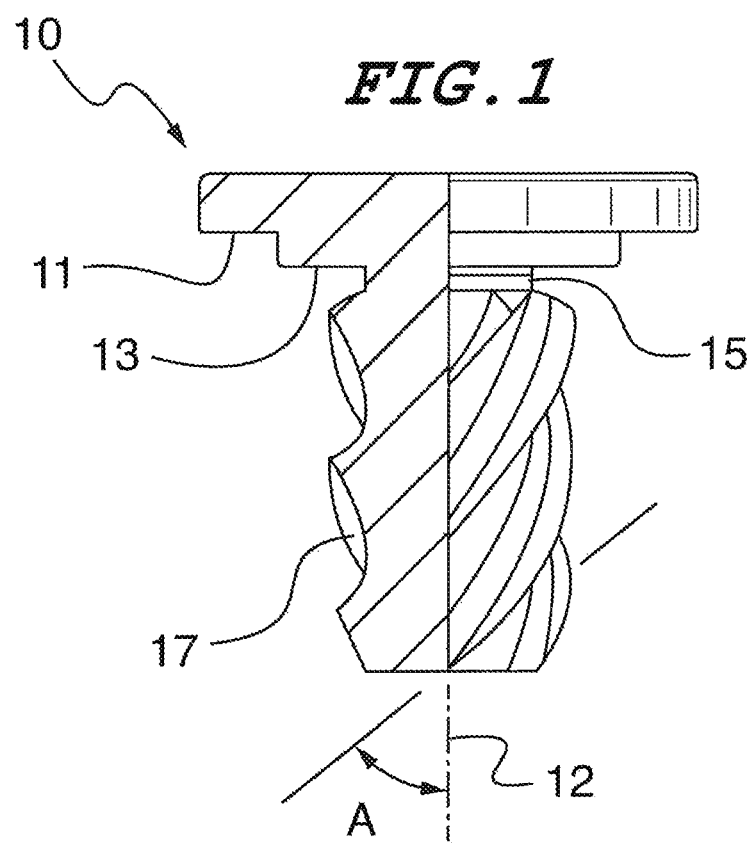
FIG. 1 is a partially-sectioned side elevation of a fastener in accordance with a preferred embodiment of the invention.

A fastener 10 in accordance with a preferred embodiment is shown in FIG. 1. The fastener generally comprises, in order from top to bottom, an enlarged head 11, a displacer 13, an undercut 15 and a helically, knurled shank 17. The helix angle A is approximately 45 degrees from the fastener axis 12 but may vary slightly depending upon its particular application.

Figure 2:
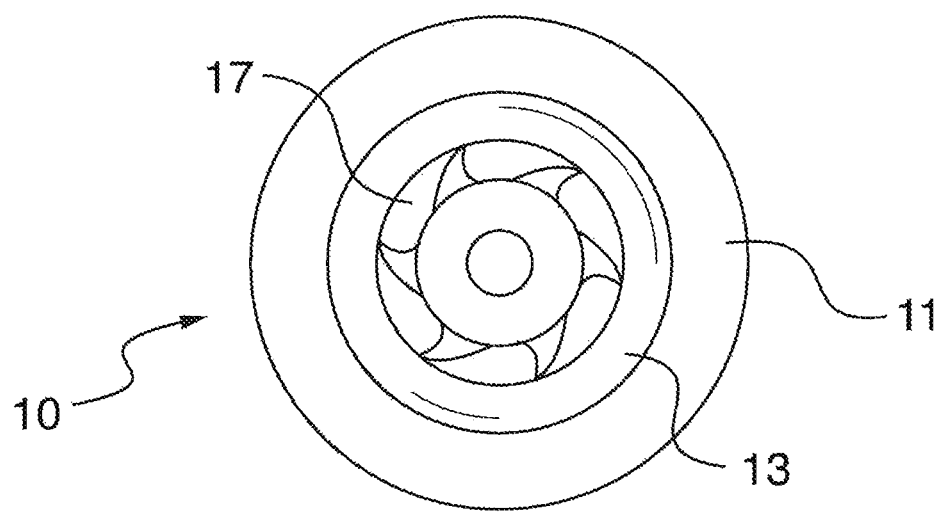
FIG. 2 is a bottom plan view of the fastener of FIG. 1.

FIG. 2 is a view from below the fastener looking upward. It shows the diametric relationship between the head 11, the displacer 13, and the knurled shank 17.

Figure 3:
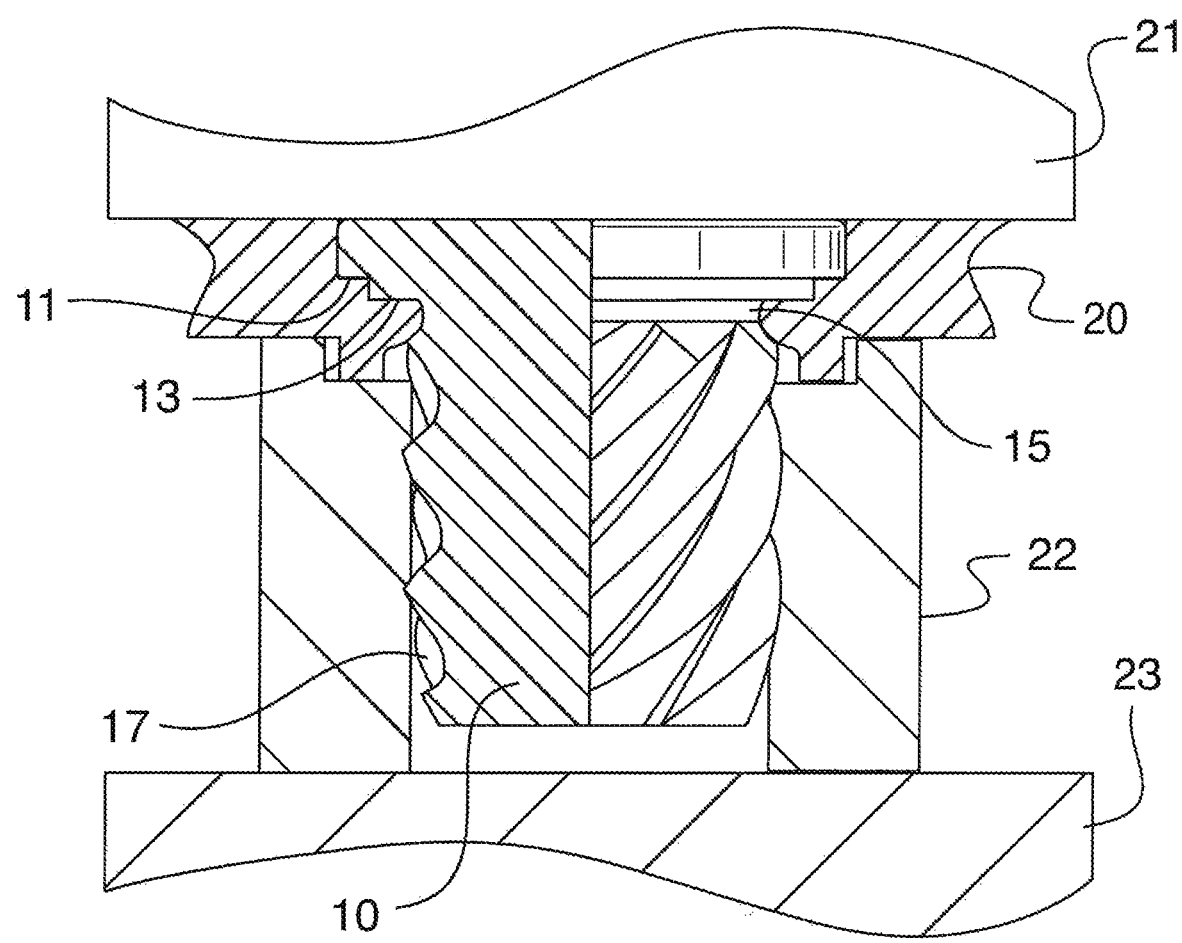
FIG. 3 is a partially-sectioned view of the fastener of FIG. 1 joining two panels by pressing between a punch above and an anvil below.

FIG. 3 shows the fastener 10 installed in two abutting panels 20 and 22, holding the panels together. The fastener 10 and panels are assembled by pressing between a punch 21 above and an anvil 23 below. Both panels have appropriately sized and aligned receiving holes to accept the fastener 10 in a single pressing stroke. The angle of the helix knurl of the fastener shank 17 of approximately 45 degrees will permit the rotation of the fastener as it is pressed in. This provides a self-threading action that reduces the required press force and provides a stronger connection. In the last portion of the press stroke the undercut 15 receives the cold flow of material from the top ductile panel 20 and thus the tack fastener 10 becomes rigidly attached to the top panel 20 which can be composed of metal such as aluminum. Simultaneously, the shank becomes rigidly attached to a bottom, less ductile panel 22 which may be composed of a plastic such as ABS or be a printed circuit board (PCB), thereby joining the two panels. In additional to the examples provided here, the panels may be composed of any suitable material according to the degree of ductility required by the particular dimensions of the fastener and the pressing force.

It will be apparent to those of skill in the art that the object of the invention has been achieved and that many variations and adaptations of what has been disclosed are possible. For example, the fastener can be composed of any material suitable for its function. Likewise, the composition and dimensions of the panels as disclosed depict but one embodiment of the invention. There may be many other variations on the embodiment depicted herein that do not depart from the spirit and scope of the invention, which shall be determined only by the claims and their legal equivalents.

The invention claimed is:

1. A press-in fastener, comprising:
   a head at a top being the largest diameter of the fastener;
   a cylindrical displacer of lesser diameter than the head and located immediately below the head;
   an undercut beginning immediately below the displacer and adapted to receive the cold flow of material from a first object caused by contact with the displacer such that the fastener is rigidly affixed to the first object;
   a spiral knurled shank extending downwardly from below the undercut to a distal bottom end of the fastener, said shank inwardly tapered beginning at the undercut and having a spiral helix knurled surface composed of helical crests, and corresponding valleys between the helical crests, said helical crests constructed at a uniformly consistent helix angle to provide a self-threading rotation to the fastener when pressed into a receiving hole of an object by interference fit, said crests and valleys winding in a continuous gradually tightening curve beginning at the undercut; and
   wherein an outer surface of the helical crests lie at a uniform helix angle of approximately 45 degrees to a central axis of the fastener.

2. The press-in fastener of claim 1 wherein an outer surface of the helical crests lie at a uniform helix angle of 45 degrees to a central axis of the fastener.

3. The fastener of claim 1 wherein the displacer is a single displacer which has an outer surface that spans 360 radial degrees.

4. The fastener of claim 1 wherein the undercut is a groove with an inner surface that spans 360 radial degrees.

5. An assembly, comprising:
   a first object composed of ductile material having a first hole for receiving a fastener;
   the fastener of claim 1 pressed into the first hole and affixed to the first object by the cold flow of material of the first object into the fastener undercut; and
   a second object having a second hole for receiving the spiral shank of the fastener whereby the shank is rigidly affixed to the second object by interference fit with the helical crests of the shank knurl such that the first and second objects are thereby rigidly affixed to each other.

6. The assembly of claim 5 wherein the first and second objects are positioned in abutment.

7. The assembly of claim 6 wherein the outer surface crests lie at a uniform helix angle of 45 degrees to a central axis of the fastener.

8. The assembly of claim 7 wherein the second object is composed of a material of less ductility than the ductility of the first object.

9. The assembly of claim 8 wherein the second object is an ABS plastic or a printed circuit board.

10. The assembly of claim 9 wherein the first object is composed of aluminum.

11. The assembly of claim 5 wherein the fastener is affixed to the second object without the fastener being deformed.

* * * * *